United States Patent
Ripper et al.

(10) Patent No.: US 11,880,865 B1
(45) Date of Patent: *Jan. 23, 2024

(54) SYSTEMS, METHODS, AND DEVICES FOR OPTIMIZING ADVERTISEMENT PLACEMENT

(71) Applicant: CPL ASSETS, LLC, Playa Vista, CA (US)

(72) Inventors: Jonathan Frederick Ripper, Los Angeles, CA (US); Steven Ostrover, Los Angeles, CA (US); Henry H. Varbedian, North Hills, CA (US)

(73) Assignee: CPL ASSETS, LLC, Playa Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/806,184

(22) Filed: Jun. 9, 2022

Related U.S. Application Data

(63) Continuation of application No. 14/841,516, filed on Aug. 31, 2015, now Pat. No. 11,386,454.

(Continued)

(51) Int. Cl.
*G06Q 30/0251* (2023.01)
*G06Q 30/0242* (2023.01)
*G06Q 30/0241* (2023.01)

(52) U.S. Cl.
CPC ..... *G06Q 30/0254* (2013.01); *G06Q 30/0242* (2013.01); *G06Q 30/0243* (2013.01); *G06Q 30/0244* (2013.01); *G06Q 30/0247* (2013.01)

(58) Field of Classification Search
None
See application file for complete search history.

(56) References Cited

U.S. PATENT DOCUMENTS

| 4,787,036 A | 11/1988 | Fleming |
| 6,285,987 B1 | 9/2001 | Roth et al. |

(Continued)

FOREIGN PATENT DOCUMENTS

| WO | WO 00/057333 | 9/2000 |
| WO | WO 2007/041159 | 4/2007 |

OTHER PUBLICATIONS

Manikandan, measures of dispersion, Oct.-Dec. 2011, Journal of Pharmacology and Pharmacotherapeutics (Year: 2011).*

(Continued)

*Primary Examiner* — Kiersten V Summers
(74) *Attorney, Agent, or Firm* — Knobbe, Martens, Olson & Bear, LLP

(57) ABSTRACT

A computing system is configured to analyze historic data generated by an optimization system to provide recommended weightings for placement of creatives on publisher's pages. The weightings may be generated by providing forecasting the likelihood that a particular creative will lead to greater conversion or revenue compared to other creatives. The creatives may be grouped into one or more phases based on the amount of statistical data available for analyzing the particular creatives such that new creatives are given sufficient weighting to receive impressions despite the lack of historical data for a creative. Performance of placed creatives may be tracked by the passing of URLs with information attached to identify the particular creative and placement.

16 Claims, 6 Drawing Sheets

Related U.S. Application Data

(60) Provisional application No. 62/044,057, filed on Aug. 29, 2014.

(56) References Cited

U.S. PATENT DOCUMENTS

| | | | |
|---|---|---|---|
| 7,085,740 B1 | 8/2006 | Meyers | |
| 7,096,193 B1 | 8/2006 | Beaudoin et al. | |
| 7,363,302 B2* | 4/2008 | Lester | G06Q 30/02 |
| | | | 707/916 |
| 7,792,698 B1 | 9/2010 | Veach et al. | |
| 7,801,802 B2 | 9/2010 | Walker et al. | |
| 7,865,397 B2 | 1/2011 | Makeev et al. | |
| 8,200,527 B1 | 6/2012 | Thompson et al. | |
| 8,316,014 B2 | 11/2012 | Endo et al. | |
| 8,321,279 B2 | 11/2012 | Jones et al. | |
| 8,355,926 B1 | 1/2013 | Hinz et al. | |
| 8,566,166 B1 | 10/2013 | Jones et al. | |
| 8,583,471 B1 | 11/2013 | Voskuhl et al. | |
| 8,768,766 B2 | 7/2014 | Ellis et al. | |
| 8,775,251 B1 | 7/2014 | Archak et al. | |
| 10,672,027 B1 | 6/2020 | Ostrover et al. | |
| 10,896,438 B1 | 1/2021 | Ostrover et al. | |
| 11,386,452 B1 | 7/2022 | Ostrover et al. | |
| 11,386,454 B1 | 7/2022 | Ripper et al. | |
| 2002/0116313 A1 | 8/2002 | Detering | |
| 2003/0135460 A1 | 7/2003 | Talegon | |
| 2003/0149937 A1* | 8/2003 | McElfresh | G06Q 30/0269 |
| | | | 715/210 |
| 2003/0171990 A1* | 9/2003 | Rao | G06Q 30/0264 |
| | | | 705/14.54 |
| 2004/0225562 A1* | 11/2004 | Turner | G06Q 30/0273 |
| | | | 705/14.69 |
| 2006/0122879 A1* | 6/2006 | O'Kelley | G06Q 30/0254 |
| | | | 705/14.46 |
| 2006/0184421 A1* | 8/2006 | Lipsky | G06Q 30/0273 |
| | | | 705/14.42 |
| 2006/0253291 A1* | 11/2006 | Ishigai | G06Q 30/0225 |
| | | | 705/14.26 |
| 2006/0259360 A1 | 11/2006 | Flinn et al. | |
| 2007/0022011 A1 | 1/2007 | Altberg et al. | |
| 2007/0027760 A1* | 2/2007 | Collins | G06Q 30/0243 |
| | | | 705/14.54 |
| 2007/0038514 A1* | 2/2007 | Patterson | G06Q 30/0267 |
| | | | 705/14.58 |
| 2007/0061488 A1 | 3/2007 | Alagappan et al. | |
| 2007/0100708 A1 | 5/2007 | Smith et al. | |
| 2007/0299682 A1 | 12/2007 | Roth et al. | |
| 2008/0052195 A1 | 2/2008 | Roth et al. | |
| 2008/0059300 A1* | 3/2008 | Hamoui | G06Q 30/0267 |
| | | | 705/14.66 |
| 2008/0059361 A1 | 3/2008 | Roth et al. | |
| 2008/0059362 A1 | 3/2008 | Roth et al. | |
| 2008/0103886 A1 | 5/2008 | Li et al. | |
| 2008/0126238 A1 | 5/2008 | Banbury et al. | |
| 2008/0183675 A1 | 7/2008 | Schwarz | |
| 2008/0201227 A1 | 8/2008 | Bakewell et al. | |
| 2008/0208841 A1 | 8/2008 | Zeng et al. | |
| 2008/0249855 A1 | 10/2008 | Collins et al. | |
| 2008/0255915 A1 | 10/2008 | Collins et al. | |
| 2008/0255922 A1 | 10/2008 | Feldman et al. | |
| 2008/0262917 A1 | 10/2008 | Green et al. | |
| 2008/0275777 A1 | 11/2008 | Protheroe et al. | |
| 2008/0288344 A1 | 11/2008 | Thrall | |
| 2009/0037317 A1 | 2/2009 | Zhou et al. | |
| 2009/0055268 A1 | 2/2009 | Knoller et al. | |
| 2009/0070212 A1* | 3/2009 | Gonen | G06Q 30/0207 |
| | | | 705/14.1 |
| 2009/0099909 A1 | 4/2009 | Phan | |
| 2009/0106094 A1 | 4/2009 | DeLine et al. | |
| 2009/0164300 A1 | 6/2009 | Gupta et al. | |
| 2009/0171710 A1 | 7/2009 | Shrivathsan et al. | |
| 2009/0171721 A1 | 7/2009 | LeBaron et al. | |
| 2009/0171780 A1* | 7/2009 | Aldrey | G06Q 30/0273 |
| | | | 705/14.69 |
| 2009/0216642 A1 | 8/2009 | Ho et al. | |
| 2009/0234734 A1 | 9/2009 | Gollapudi et al. | |
| 2009/0248534 A1 | 10/2009 | Dasdan et al. | |
| 2010/0042421 A1 | 2/2010 | Bai et al. | |
| 2010/0082392 A1* | 4/2010 | Yang | G06Q 10/087 |
| | | | 705/28 |
| 2010/0088373 A1 | 4/2010 | Pinkham | |
| 2010/0114654 A1 | 5/2010 | Lukose et al. | |
| 2010/0211455 A1 | 8/2010 | Williams et al. | |
| 2010/0228635 A1 | 9/2010 | Ghosh et al. | |
| 2010/0257054 A1* | 10/2010 | Martin | G06Q 30/02 |
| | | | 705/14.46 |
| 2010/0262497 A1 | 10/2010 | Karlsson | |
| 2010/0262499 A1* | 10/2010 | Karlsson | G06Q 30/0276 |
| | | | 705/400 |
| 2011/0016408 A1 | 1/2011 | Grosz et al. | |
| 2011/0071900 A1 | 3/2011 | Kamath et al. | |
| 2011/0125573 A1* | 5/2011 | Yonezaki | G06Q 30/0249 |
| | | | 705/14.48 |
| 2011/0238487 A1 | 9/2011 | Chang et al. | |
| 2012/0310729 A1 | 12/2012 | Dalto et al. | |
| 2013/0110640 A1 | 5/2013 | Powell et al. | |
| 2013/0173380 A1* | 7/2013 | Akbari | G06Q 30/0267 |
| | | | 705/14.43 |
| 2014/0058872 A1 | 2/2014 | Sandholm et al. | |
| 2014/0156379 A1 | 6/2014 | Pani et al. | |
| 2014/0188593 A1 | 7/2014 | Sun | |
| 2014/0195398 A1 | 7/2014 | Rose et al. | |
| 2014/0249872 A1 | 9/2014 | Stephan et al. | |
| 2014/0279055 A1 | 9/2014 | Jones et al. | |
| 2014/0325055 A1 | 10/2014 | Oh et al. | |
| 2015/0161679 A1* | 6/2015 | Tang | G06Q 30/0275 |
| | | | 705/14.71 |
| 2015/0220939 A1 | 8/2015 | Tay | |
| 2020/0302484 A1 | 9/2020 | Sears et al. | |

OTHER PUBLICATIONS

Borgs et al., "Dynamics of Bid Optimization in Online Advertisement Auctions," In Proceedings of International World Wide Web Conference, May 8-12, 2007.

"Revenue", dictionary.com definition as obtained from https://www.dictionary.com/browse/revenue on Nov. 23, 2021 in 7 pages.

Manikandan, S., "Measures of Dispersion", Journal of Pharmacology and Pharmacotherapeutics, Oct.-Dec. 2011, vol. 2, No. 4, pp. 315-316.

* cited by examiner

SYSTEMS, METHODS, AND DEVICES FOR OPTIMIZING ADVERTISEMENT PLACEMENT

CROSS-REFERENCE TO RELATED APPLICATIONS

This application is a continuation of U.S. patent application Ser. No. 14/841,516, now U.S. Pat. No. 11,386,454, filed Aug. 31, 2015, and titled SYSTEMS, METHODS, AND DEVICES FOR OPTIMIZING ADVERTISEMENT PLACEMENT, which claims the benefit under 35 U.S.C. 119(c) to U.S. Provisional Application No. 62/044,057, filed Aug. 29, 2014, and titled SYSTEMS, AND METHODS FOR OPTIMIZING ADVERTISEMENT PLACEMENT, both of which are hereby incorporated herein by reference in their entirety.

BACKGROUND

Field

The embodiments of the disclosure generally relate to systems, methods, and devices for the efficient and optimized distribution of impressions through a web interface.

Description of the Related Art

Some previous systems have utilized algorithms for optimizing the performance of the purchases of advertisement placements. Such systems may attempt to identify the placements with the greatest chance of a successful event and attempt to prioritize those over less productive placements. However, such systems do not optimize the creative that is used to fill such a placement and is not based on the overall revenue generated by particular creatives allocated to such particular placements.

SUMMARY

This Summary section provides a brief overview, in general terms, of subject matter disclosed in this application. This section is meant to facilitate general understanding, not to describe all aspects of the invention or to identify every embodiment or variation of the invention. Accordingly, as a skilled artisan will appreciate, the invention is not limited to the aspects or embodiments described in this Summary section. Various embodiments of the present invention relate to the optimization of advertisement placement across networked locations. In an embodiment, the systems, methods, and devices disclosed herein comprise a computer implemented method for placement of creatives through a web server comprising receiving, by a computer system, a plurality of creatives for distribution through an ad-server, forecasting performance characteristics of the plurality of creatives, designating a phase for each of the plurality of creatives, wherein there is at least a first phase and a second phase, determining, for each of the plurality of creatives, a confidence measurement indicating the likelihood a particular creative will outperform other creatives; allocating a total first phase weight to the first phase and a total second phase weight to the second phase, allocating, to each of the plurality of creatives, a weight representing the likelihood of selection for placement by the ad-server such that creatives designated for the first phase have weightings adding up to the total first phase weight and creatives designated for the second phase have weightings adding up to the total second phase weight, and transmitting, the weightings associated with the plurality of creatives to an ad-server.

BRIEF DESCRIPTION OF THE DRAWINGS

The foregoing and other features, aspects and advantages of the embodiments of the invention are described in detail below with reference to the drawings of various embodiments, which are intended to illustrate and not to limit the invention. The drawings comprise the following figures in which.

DETAILED DESCRIPTION OF THE EMBODIMENTS

Figure 1:
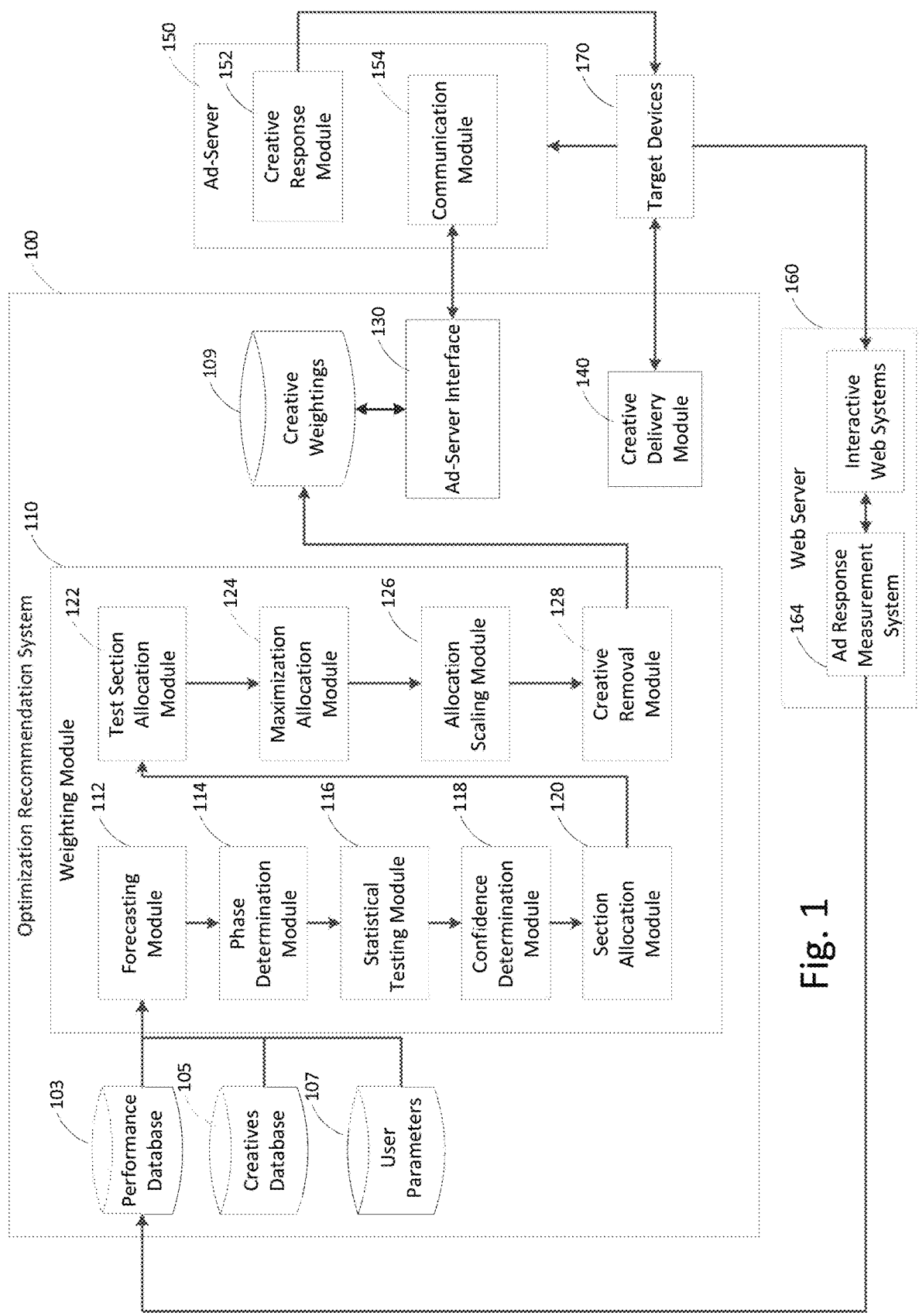
FIG. 1 is an embodiment of a schematic diagram illustrating a system for optimization of advertisement placement.

The following description describes example embodiments, which are provided for illustrative purposes only. The present invention is not limited to the example embodiments provided below, and the example embodiments should not be considered to limit the present invention.

In some embodiments, an optimization recommendation system may be designed to allocate pre-purchased inventory (e.g., impressions) among alternative advertisements or placements. Each advertisement can be comprised of a unique combination of a product vertical ("v") and a creative design ("c"); however, note that, in the sections that follow—in the naming of the algorithm—the terms 'advertisement' and 'creative' (generally denoted as creative 'c') may be used interchangeably.

Allocations can be performed for each active placement-strategy and, for each such placement-strategy, take the form of weightings for all advertisements that a user or administrator has placed in rotation. The weight for each advertisement within a placement-strategy may indicate the proportion of times that advertisement is to be selected for display in response to a call from the placement's publisher for delivery of an impression.

Disclosed are improved systems and methods for determining the allocation of creatives' placement on various advertisers' webpages. In general the creatives are treated as individual components of an advertiser campaign placement and creative system. The system can deal with various advertisers with each of the advertisers having a specific business structure. Each of those advertisers may have a specific campaign which determines why the creatives are being placed.

For each campaign advertising may be allocated to various placements. The placements are physical locations on a publisher's webpage. For example, the physical location could be a banner ad at the top, side or bottom of a webpage. Within a placement there may be various ad strategies. The ad strategies, or simply strategies, are the structures determining how creatives are going to be placed. For example, the strategy may be based upon the type of device where a web page is delivered. Therefore, one strategy could be directed towards a mobile device, another towards a desktop computer and could be given various strategies based on other parameters. For example, one strategy could be for a different type of browser or a different operating system or other aspects of a particular device that is calling for an advertisement through a web page.

Also within a particular placement there may be various verticals. For example, in the context of one advertiser they might have specific campaigns in a mortgage vertical, an insurance vertical, a student loan vertical, or the like. Thus, particular creatives to be placed in a placement may be associated with one or more verticals.

In some embodiments, particular creatives may then be associated with one or more strategies or verticals which are in turn associated with particular placements. Each creative may be the actual image and/or text that is shown to one or more user devices that receive the creative in a placement. In the first step the system may take the creatives that are available to it and forecast how well each of the creatives will perform. The forecasts may be done at a placement level, a strategy level, a creative level, a vertical level, or other levels. In some embodiments the forecasting may be done to forecast the click-through rate, the conversion rate, the revenue rate, or various other metrics which may indicate the performance of a creative. In some embodiments other measurements of the potential success of a creative may be forecast in different manners.

In some embodiments, creatives for a particular placement, strategy, or creative may be analyzed based on particular phases. For example, the phases may be based on the amount of information and data available for a particular creative. The creative phases may include an initial phase, a middle phase and a maximization phase wherein the phases are based upon the amount of data available for the creative and the amount of processing that can be done on that data. For example in an initial phase, the weightings may be assumed as the average of how other creatives in the initial phase have performed in the past. After a certain point in time, the creative may reach a point that more detailed analysis can be done to predict its future value. At this moment it may turn to the middle phase. Eventually those creatives that have been shown to have some value over time may be placed into the maximization phase where they are provided in the most efficient manner possible to maximize the amount of revenue that is provided to the system by the use of creatives. Throughout this description the first and middle phases may be referred to as a preliminary and promotion phase, respectively. In some embodiments, and for some ease of description, the preliminary and promotion phases may be collectively termed the test phase. The description as the test phase is suitable because as that is the phase where the creatives are tested to determine if they should advance to the maximization phase and at which there will be comparison points for the creatives over time for use in the analysis during the maximization phase.

In some embodiments, the system may perform a testing process to determine characteristics for how well a creative may do compared to other creatives that are used in the system. For example, a creative may be generating revenue and in isolation appear to be beneficial to the user of the system. However, if there is another creative in the system at that time which generates more revenue, such a creative should be prioritized by the system for allocation to a placement. In some embodiments statistical determine a confidence value for the likelihood that a particular creative will outperform other creatives that are available for the same placement. The confidence values may then be converted into weightings that determine what percentage of time each creative will be returned to an ad-server for use by the system. For example there may be an initial set of weightings for creatives as they are entered into the system. Then, based on the most recent performance of the various creatives the creatives may be scaled up or scaled down to have higher or lower weightings.

In some embodiments, after these weightings are adjusted to meet allocations requirements for particular phases. For example, the testing phases and maximization phase may have a set percentage of the placement weightings allocated to the particular phases. The weightings for the creatives in a particular phase may then be adjusted such that each phase has weightings aggregating to the total available weighting for the phase.

The final weightings allocated to particular creatives may then be provided to an ad-server that provides a selected creative in response to requests from web pages accessed by target devices. The ad-server may respond by providing a URL enabling access to the selected creative by the target device for placement in the web-page. The creatives may be selected by the ad-server based on the weighting for the particular creatives, wherein the better performing creatives have higher weightings and are selected more frequently. However, poorer performing creatives may still be selected, albeit at a lower rate, such that additional statistical information is generated for the system to use. While the systems and methods disclosed herein are generally described in reference to supplying advertisements through a web browser, others systems may also be served through the system. For example, television, print, mobile, in-game, or other advertising platforms may have advertisements automatically selected for placement using the weightings generated by the optimization recommendation system as disclosed herein.

In some embodiments, if a target device indicates that it has selected the advertisement or creative for example by registering a click on a creative, then a URL associated with the creative may be supplied to the web browser running on the target device to open an associated web page. The URL call may also have encoded data that provides information indicating that the target device actually clicked on a particular creative served by the ad-server. At this point the web server may continue to track the target device and the user of the device based upon the URL that was provided when the creative was selected by the target device. This may at the end of the system's interaction with the target device provide information indicating a successful click through, whether or not there was a conversion, how much revenue was generated off the conversion either from the initial response or from further revenue generation further in a sales cycle, or other information about the user's value and the value gained from the associated creative.

The particular calculations, organizational routine, automation and systems provided herein improve the quality which creatives are directed towards target devices accessing one or more web pages and the further revenue that is generated from those creatives. In particular the pre-processing of statistical information based on past performance data of creatives and pre-allocation of creative weightings is based on the aggregation of creatives within particular campaigns, advertisers, strategies, and verticals. This allocation provides an optimization for creatives as they are introduced to the system as well as comparing which creatives will perform best for various different verticals, strategies, and placements within the system.

In some embodiments, the particular weighting provided to each of the creatives in a particular placement may be adjusted intra-day as new results are received. For example in some embodiments, a snapshot is taken one or more times a day which shows the overall statistical performance of the various creatives and aggregated data within the system. These snapshots may then be compared to the next snapshot taken periodically throughout the day or as new data is received continuously. For example, as new data comes into the system, a periodic snapshot may be taken to show which creatives have outperformed the expected values based on forecasted values for the creatives, actual performance of the creatives, and reference values for the system as a whole.

In some embodiments, the system may also take into account various external factors which may be used to adjust the actual statistics and performance provided by the various creatives. For example, a large media purchase or a large buyer stopping purchases may be used to adjust the prediction of how many click-through events are expected from creatives during a particular time period, how many conversions are expected from a particular creative, and how much revenue is provided by a particular creative. Adjustment factors may also be generated at the aggregate level. In general, relying on historical data may project out that the same thing will continue to happen, therefore, the adjustment factors may be used to forecast the demand and supply as time moves forward and between particular snapshots indicating the statistical performance of creatives to changing market conditions.

In some embodiments, as the system optimizes recommended weighting to provide the greatest maximum revenue and conversion rate, the system may allocate a certain amount of the weighting to the test phase and the maximization phase. Then, for each of the phase groups, the creatives may be interpreted and given a percentage weighting for how often when a percentage is allocated to the test or maximization phase each creative within that test or maximization phase will be selected for placement by the ad-server. This staged allocation balances the introduction of new creatives into the system while maximizing revenue and giving enough time to other or new creatives to be tested to determine whether each of those creatives has long term revenue generation value.

In some embodiments, in the promotion and maximization phases each of the weightings provided to the creatives may also have an aggressiveness factor associated with them. The aggressiveness factor may adjust the weighting of the highest performing creatives such that the better creative are given a weighting in excess of the confidence value for the creative. This may particularly favor the strongest performing creatives as those are the most likely to outperform other creatives.

In some embodiments, the system may limit the amount of change in weightings for a particular creative based on a scaling up factor and/or a scaling down factor. For example, if a creative within the promotion phase has a particularly good day where they have a high conversion rate then that creative will likely go up as far as the percentage weighting that it is given. However in the interest of not having an outlier data overly affect the performance of a system as a whole, a scaling up factor may be used to determine how much the system can rely on a single day or a single change in a creative's performance before changing the weighting. This ensures that new, recently added, or creatives that also have positive performance are given impressions to use for further statistical data and potentially identifying future revenue generating creatives. For example, a new creative may be given a particular value and only change a small amount at a time based on the scaling factors.

According to certain aspects, one time each day, before the first processing of creatives through the optimization recommendation system, a snapshot is taken of the performance data for creatives currently in rotation in the system. The snapshot can be used to determine, which placements and placement-strategies are included for analysis by the optimization recommendation, various characteristics of the included placements and creatives, and preliminary designation of active creatives.

In some embodiments, based on information contained in the current and a previous snapshot two Snapshots the system may set a preliminary designation to whether creatives within eligible placement-ads are active and thereby subject to having a weight computed by the optimization recommendation system. In some embodiments, the system may also perform an initial check on each included placement-strategy to determine if weights for the placement-strategy should be computed by the optimization recommendation system. In some embodiments, the placement-strategy may be initially identified as not being subject analysis by the system if the subject placement-strategy generated a number of impressions on the previous day less than a defined threshold, and either there is only one vertical running on the placement-ad; or the previous day is comparable to the day for which weights are being currently determined. In some embodiments, the system may exclude one or more placements or placement-strategies if the cost targets are not available for the current day.

Although several embodiments, examples, and illustrations are disclosed below, it will be understood by those of ordinary skill in the art that the invention described herein extends beyond the specifically disclosed embodiments, examples, and illustrations and includes other uses of the invention and obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, embodiments of the invention can comprise several novel features and no single feature is solely responsible for its desirable attributes or is essential to practicing the inventions herein described.

FIG. 1 depicts an embodiment of a block diagram of an optimization recommendation system 100. In some embodiments, the system may include a weighting modue 110, an ad-service intervace 130 a creative delivery module 140 and various databases 103, 105, 107, 109. The optimization recommendation system 100 may communicate with an ad server 150, target devices 170, and the like. In some embodiments, the optimization recommendation system may provide instructions to an ad-server for delivering one or more creatives to particular placements on web-publishers websites. The ad-server may then provide those creatives to users using target devices 170 when the devices access web pages with placements controlled by the ad-server. If the target device 170 registers and input recognizing a click of a delivered creative, the optimization recommendation system 100 may then provide access a URL to control navigation of a browser operating on the target device 170. The target device 170 may then navigate to a web page provided at the URL by a web server, the web page may have interactive systems 162, which the target device interacts with to provide the features sought by the user. The web server 160 may also have an ad response measurement system 164 that tracks the progress of the target device 170 and provides data about the user's experience to the optimization recommendation system 100 to update a performance database 103 to improve recommendations of creatives. In some embodiments, the optimization recommendation system 100 may provide only the recommended weightings of various creatives while communication with ad-servers 150, target devices 170, web servers 160, and various other systems is performed by other systems.

In some embodiments, the weighting module 110 performs various algorithmic processes to optimize the delivery of creatives across the web to one or more target devices 170 in order to garner improved response. The weighting module may receive information from various sources, including a performance database 103, a creatives database 105, and user parameters 107. In some embodiments, previous creative weightings may also be provided as an input to the weighting module from a creative weightings database 109.

Performance data stored in the performance database 103 may include data on historical performance of advertisements throughout a defined historical timeframe (for example, the preceeding seven days), at the most granular level (for example, a particular creative at a particular placement). The performance data may be stored as aggregated to the placement-strategy-creative, placement-strategy-vertical, placement-strategy, placement and vertical levels. In some embodiments, fewer or additional pieces of information may be provided regarding historical performance.

In one particular embodiments, as an example, historical performance data may be provided at five levels of granularity, including: placement-creative (a specific advertisement on a specific placement); placement-strategy-creative (a specific advertisement within a specific strategy on a specific placement); placement-strategy-vertical (aggregation of all advertisements for a specified product vertical within a specific strategy on a specified placement); placement-strategy (aggregation of all advertisements within a specified strategy on a specified placement); and vertical (aggregation of all advertisements for a specified product vertical across all strategies and placements).

In some embodiments using the levels described in the example, some particular characteristics and definitions associated with the historical timeframe may be provided. For example, the number of impressions, served for a particular creative at a particular placement, strategy, and/or vertical throughout a defined historical timeframe may be defined as $Imps_x$. The number of clicks generated by a particular creative associated with a placement, strategy, and/or vertical throughout a defined historical timeframe may be defined as $Clks_x$. The number of inquiries for a particular creative at a particular placement, strategy, and/or vertical throughout a defined historical timeframe may be defined as $Inqs_x$. The amount of revenue generated by a particular creative at a particular placement, strategy, and/or vertical throughout a defined historical timeframe may be defined as $Rev_x$. The amount of cost for a particular creative at a particular placement, strategy, and/or vertical throughout a devined historical ime frame may be defined as $Cost_x$.

Each of these characteristics describing the performance of a particular creative may be aggregated into various levels, for example, a particular creative's performance may be given a click count for a particular placement and strategy. The click count for that particular creative may then be aggregated when generating click characteristics for corresponding strategies, placements, and verticals.

In some embodiments, the performance database may also include the results of a sampling procedure to generate information on the volatility of revenue per inquiry ("RPI") performance at the vertical and placement-vertical levels. This process can return values indicating the standard deviation of RPI values across all inquiries generated by all creatives. In some embodiments, this information may also be aggregated to generate a standard deviation of RPI values across all inquiries generated by all creatives associated with vertical v, across all ads and placements ("SD(RPI)v") or the standard deviation of RPI values across all inquiries generated by all creatives associated with vertical v on placement p ("$SD(RPI)_{p-v}$")

The creatives database 105 may include particular creatives that are active within the system. The particular creatives may be actually stored in the creatives database 105, or else the creatives database 105 may provide statistics on the creatives that have been analyzed by the system, including a list of those creatives that should be active within the system. The creatives database In some embodiments, the weighting module 110 may also receive information of specific user parameters. For example, user parameters may include (i) historical data and sampling parameters; (ii) algorithmic parameters; (iii) day-of-week adjustment factors; (iv) daily settings; and/or (v) cost targets for CPA (per-inquiry targets) and CPC (per-click targets) placements. For example, in some embodiments, a user or administrator of the system may be able to set values for one or more of the following categorized parameters, which may be referred to herein by the variables associated with the described parameters.

Metric Computation Parameters $MinImpsPlmt_{ver}$=minimum number of impressions for placement to be deemed active yesterday $MinImpsCTR_{ver}$=minimum number of impressions for an average CTR value to be computed $MinClksCR_{ver}$=minimum number of clicks for an average CR value to be computed $MinInqsRPI_{ver}$=minimum number of inquiries for an average RPI value to be computed $TarClksCTR_{ver}$=target number of clicks for an average CTR value to be computed $TarInqsCR_{ver}$=target number of inquiries for an average CR value to be computed $RngFac_{ver}$=range factor establishing intervals for weighting computations Confidence Adjustment Parameters $HghConfTshd_{ver}$=threshold for identifying a confidence value as 'high' on CPA placements Initial Weightings for Test Group Parameters $MaxIncPre_{ver}$=maximum increase from yesterday's weighting for a creative in Preliminary phase:

$MaxWghtPro_{ver}$=maximum weight for a creative in Promotion phase $DfltCapTest_{ver}$=default value of cap for amount of weight that can be collectively allocated to all creatives on a placement within the Preliminary and Promotion phases (jointly, Test group)

$TshdCreTest_{ver32}$ threshold number of creatives for increasing allocation to testing:

IncRateTest$_{ver}$=rate of increase for testing allocation based on number of creatives:

MaxIncTest$_{ver}$=maximum increase to base testing allocation:

MinCapTest$_{ver}$=minimum value of cap for amount of weight that can be collectively allocated to all creatives on a placement within the Preliminary and Promotion phases (jointly, Test group)

MaxCapTestST$_{ver}$=maximum value of cap for amount of weight that can be collectively allocated to all creatives on a placement within the Preliminary and Promotion phases (jointly, Test group) when a statistical test is applied Aggressiveness Factor Parameters AggBas(pg)$_{ver}$=base value for computation of aggressiveness factor on a placement with performance goal pg AggScaRot$_{ver}$=scaling factor for computation of rotation component of aggressiveness factor on a placement AggPosTolConf$_{ver}$=tolerance range for positive confidence for computation of confidence component of aggressiveness factor on a placement AggNegTolConf$_{ver}$=tolerance range for negative confidence for computation of confidence component of aggressiveness factor on a placement AggPosValConf$_{ver}$=value for positive confidence for confidence component of aggressiveness factor on a placement AggNegValConf$_{ver}$=value for negative confidence for confidence component of aggressiveness factor on a placement AggScaDisp$_{ver}$=scaling factor for computation of dispersion component of aggressiveness factor on a placement AggMaxDisp$_{ver}$=max value for dispersion component of aggressiveness factor on a placement Scaling Constraints Parameters MinWght1Day$_{ver}$=minimum weighting for a creative that was placed into rotation on a placement yesterday InqsScDnCon$_{ver}$=number of inquiries activating scaling-down constraint WghtScDnCon$_{ver}$=previous day's weight level activating scaling-down constraint RedScDnCon$_{ver}$=constraining reduction factor for scaling-down constraint InqsScUpCon$_{ver}$=number of inquiries activating scaling-up constraint WghtScUpCon$_{ver}$=previous day's weight level activating scaling-up constraint LvlScUpCon$_{ver}$=constraining weight level for scaling-up constraint IncScUpCon$_{ver}$=daily increase factor activating scaling-up constraint Removal from Rotation Parameters RmvTshdPro$_{ver}$=threshold for removing a creative in Promotion phase from a placement's rotation RmvTshdMax$_{ver}$=threshold for removing a creative in Maximization phase from a placement's rotation NumRedMax$_{ver}$=number of creatives in rotation on a placement below which the removal threshold is decreased:

AmtRedMax$_{ver}$=amount by which RmvTshdMax$_{ver}$ is reduced when number of creatives in rotation on a placement is less than NumRedMax$_{ver}$ Day-of-Week Adjustment Parameters AdjWkndCTR$_v$=forecast ratio of average weekday to non-weekday CTR for vertical v AdjWkndCR$_v$=forecast ratio of average weekday to non-weekday CR for vertical v AdjWkndRPI$_v$=forecast ratio of average weekday to non-weekday RPI for vertical v AdjDayRPI$_v$=forecast ratio for vertical v of average current day RPI to average RPI across all days within the defined timeframe for accessing historical data, adjusted as appropriate intraday to target revised RPI forecasts NonWkdyFlg=flag indicating whether weightings are being performed for a day other than a 'normal' weekday, equal to 'y' if weightings are for a weekend or holiday, or 'n' if weightings are for a 'normal' weekday.

DayAftNWFlg=flag indicating whether weightings are being performed for a day after other than a normal weekday, equal to 'y' if the current weighting day follows a weekend or holiday, or 'n' if the current weighting day follows a normal weekday.

MedDayFlg=flag indicating whether weightings are being performed for a day on which there is a Media Day for any vertical, equal to 'y' if weightings are for a Media Day, or 'n' if not.

DayAftMDFlg=flag indicating whether weightings are being performed for the day after a Media Day was run for any vertical, equal to 'y' if the current weighting day follows a Media Day, or 'n' if not.

VM=set of Verticals v for which Media Days can potentially be run

MedDayFlg$_v$=flag indicating whether weightings are being performed for a Media Day for Vertical v, equal to 'y' if weightings are for a Media Day for Vertical v, or 'n' if not.

DayAftMDFlg$_v$=flag indicating whether weightings are being performed for a day after a Media Day for Vertical v, equal to 'y' if the current weighting day follows a Media Day for Vertical v, or 'n' if not.

Cost Target Parameters

For any placement p for which the underlying cost structure is 'CPC' or 'CPA', a per-unit cost target can be provided for each vertical running on the placement, as follows:

CostTar(pg)$_{p-v}$=target cost per click (equal to standard unit cost) for vertical v on placement p if underlying cost structure is 'CPC'; target RP$_v$ (as specified by media buyers) for vertical v (e.g., this value applies across all placements) if underlying cost structure is 'CPA'; and null if underlying cost structure is 'CPM'

In addition to the example parameters given above, in certain embodiments, the approach to system regulation may be determined at least in part by a user or administrater in the user parameters 107. Such parameters may include interaction with a campaign management system; specification of which placement and strategies within the media plan the weighting module may be applied to; current and historical status of creatives 'in rotation' on these placement and strategies; and introduction by users or administrators of new creatives into rotation.

In addition, user parameters 107 may include adjustment parameters for use in determining aggregation statistics. For example, the adjustment parameters may be applied to raw data elements such as clicks, inquiries, and revenue at the placement-strategy-creative daily level. Any placement-strategy-creative daily value for any of these three raw data elements that is employed as an input to any of the computations identified in the remainder of this document can be adjusted in accordance with the rules identified in this section. For example, a user parameter may indicate the type of day being a weekday, weekend, non-weekday, or holiday. The optimization recommendation system 100 may then use an adjustment factor to determine forecasted characteristics for particular creatives based on the adjustment factor and may be used to generate adjusted historical characteristics based on the status of previous days.

The nine modules displayed in FIG. 1 as operating withing the weighting module 110 may comprise the particular processes and methods performed by the system to determine the appropriate placement of various creatives. For purposes of description, the sub-modules shown routines can be logically organized within four overarching processes—Forecasting, Phasing, Statistical Testing and Weighting.

First, the historical performance data may be converted to forecasts of performance at the placement-strategy-creative, placement-strategy-vertical and placement-strategy levels with respect to click-through rate ("CTR"), conversion rate ("CR"), impression conversion rate ("ICR"), revenue per inquiry ("RPI") and revenue per thousand impressions ("RPM"). The computations, performed by the forecasting module 112 in FIG. 1 may comprise two components: applying adjustments to raw data inputs and establishing forecasts of performance metrics for particular creatives and references. These forecasts may then be aggregated to establish aggregate forecasts and reference values. Forecasting is described in further detail in FIG. 2 below.

In forecasting the performance of reference values, often a first attempt may be made to compute historical averages with reference to only those placement-ad-creatives currently in rotation on CORE. If not enough data is available on placement-ad-creatives currently in rotation, an average value referencing all placement-ad-creatives represented in the data input—e.g., including those had been removed from rotation sometime within the historical timeframe—can be employed Second, based primarily on data availability, the creatives may be designated as belonging to a particular phase by the phase determination module 114. As described herein phases are generally referred to as preliminary (for relatively new creatives), promotion (for established creatives), and maximization (for those creatives with revenue maximizing potential). In various embodiments, there may be fewer or additional phases than as disclosed herein. For example, the phases may be represented as test and maximization phases without further description of particular phases withing the test phase. In some embodiments, the particular phase designation for a creative may establish the combination of key performance metrics that may be employed for statistical testing and weighting. Example processes of determining a phase for a creative are discussed below with reference to FIG. 3.

Third, The statistical testing module 116 may perform tests on the historical performance data to determine the likely future performance of a creative or aggregation of creatives. For example, the statistical testing module 116 may generate estimates of standard deviations of particular metrics reflecting the statistical tests assessing the likelihood that future performance of a specified placement-strategy-creative with respect to a specified metric may exceed the future performance of a specified 'reference' group. In addition to tests at the placement-strategy-creative level, in some embodiments, one test can be performed on each placement-strategy to compare the aggregate performance of two groups of creatives. For example, those creatives that are in the 'preliminary' or promotion' phases (for which historical data on each individual creative is limited) versus those in 'maximization' phase (for which more data is available).

In some embodiments, the confidence determination module 118 may reduce the results of all statistical tests for a unique placement-strategy-creative, and in some cases apply an adjustment establish a single measure of 'confidence' on its future performance prospects. In certain embodiments, statistical tests may be conducted to establish quantitative measures of the prospects for individual placement-strategy-creatives and groups of creatives in rotation on ads to perform well. For example, creatives may be compared to reference values to determine the likelihood of outperforming other creatives. For each test, a performance metric can be specified and a forecast of the future performance of a subject creative or group of creatives on an ad can be compared to a forecast of the future performance of a reference group. A test statistic may be computed and the value of the test statistic may be referred to as a distribution. The output of each test may reflect the area under a portion of the distribution, and may be used by the confidence determination module 118 to establish an estimate of the likelihood that the subject creative would in the future, if retained in rotation, outperform the reference group. For example, the estimate may be on a scale of 0=100% likelihood that a creative will outperform the reference group. This likelihood estimator can be interpreted as a measure of the level of 'confidence' a CM would have about the future prospects for the subject creative or aggregated group of creatives.

In some embodiments, the fourth overarching process may be the conversion of the confidence determinations into weights useful by the optimization recommendation system 100 and ad-server 150. In the fourth overarching process, the confidence determination module 118 may convert the placement-strategy-creative confidence measures may be converted into weights for the placement-strategy-creatives based on algorithmic rules. In some embodiments, for example, for each creative, the previously computed confidence measures associated with various individual performance metrics may be reduced to a single confidence value.

The single confidence value for a placement-strategy-creative can be equal to: (i) the CTR confidence value if the placement-strategy-creative is in the preliminary phase; (ii) the ICR confidence value if the placement-strategy-creative is in the promotion phase; and (iii) the RPM confidence value if the placement-strategy-creative is in the maximization phase. In some embodiments, the system may adjust for point estimates when there is sufficient data. For example, if there are at least two creatives within a particular strategy in the maximization phase an adjustment can be applied to the confidence value computed in the previous section for active creatives in maximization phase with high confidence levels to differentiate weightings on the basis of PPM and CPM point estimates.

In some embodiments, the section allocation module 120 may determine the maximum allocation to the test phases and the maximization phase. In some embodiments, the maximum allocation to each of the particular phases may also be determined by the system. For example, the section allocation module 120 may compare the potential of all creatives within the preliminary and promotional phases (collectively comprising the test group) with the performance of all creatives in the maximization phase to determine an appropriate cap on aggregate allocation to the test group. Thus, the allocation to the initial phase may be based on the likely future performance of the preliminary and promotion phases to the maximization phases. In some embodiments, the allocation may be based on the likely performance of the test group compared to the maximization group, but may also have constraints on the maximum scaling up and scaling down of the allocation to the test group or caps on the size of the allocation itself.

The test section allocation module 122 may determine an initial allocation to each of the creatives which are determined as allocated to either the preliminary or promotion phases. In some embodiments, the test section allocation module 122 may also scale down the initial allocation to particular creatives in order to comply with the specified aggregate cap.

The maximization allocation module 124 may allocate the aggregate amount of weight available for creatives in the revenue maximization phase among individual creatives in the maximization phase. In some embodiments, an allocation scaling module 126 may apply constraints to the initial weightings to ensure that the weightings for each creative are scaled up and down according to the system constraints, for example, constraints set by the user parameters. Finally, creative removal module 128 may remove from rotation those placement-strategy-creatives that would otherwise receive allocations below specified thresholds. Examples of determination of initial and final weightings by the associated modules of the weighting module are described in further detail with respect to FIG. 4 below.

After the weighting module 110 determines weightings for active creatives, the weightings are stored in a database 109. An ad-server interface may then provide the creative weightings with a description of how to use the weightings to the communication module 154 of an ad-server 150. For example, the particular address of creatives to be used by the ad-server may be provided through an application programming interface or another interface between the optimization recommendation system 100 and the ad-server 150. When a target device 170 access a web page served by the ad-server 150, the creative response module 152 may then provide the target device 170 with information on how to retrieve a particular creative for the ad space. The target device may then access a creative delivery module 140 at the optimization recommendation system 100 to retrieve the particular creative. In some embodiments, the ad-server may provide the creative directly, but to conserver computing resources, the creative may be generally provided by a creative delivery module 140. The delivered creative may then have a URL provided with a particular source ID that aids in tracking the effectiveness of an add through the presentation, clicking, and revenue generation stage to generate data that is provided by an ad response measurement system 164 to the performance database 103.

Figure 2:
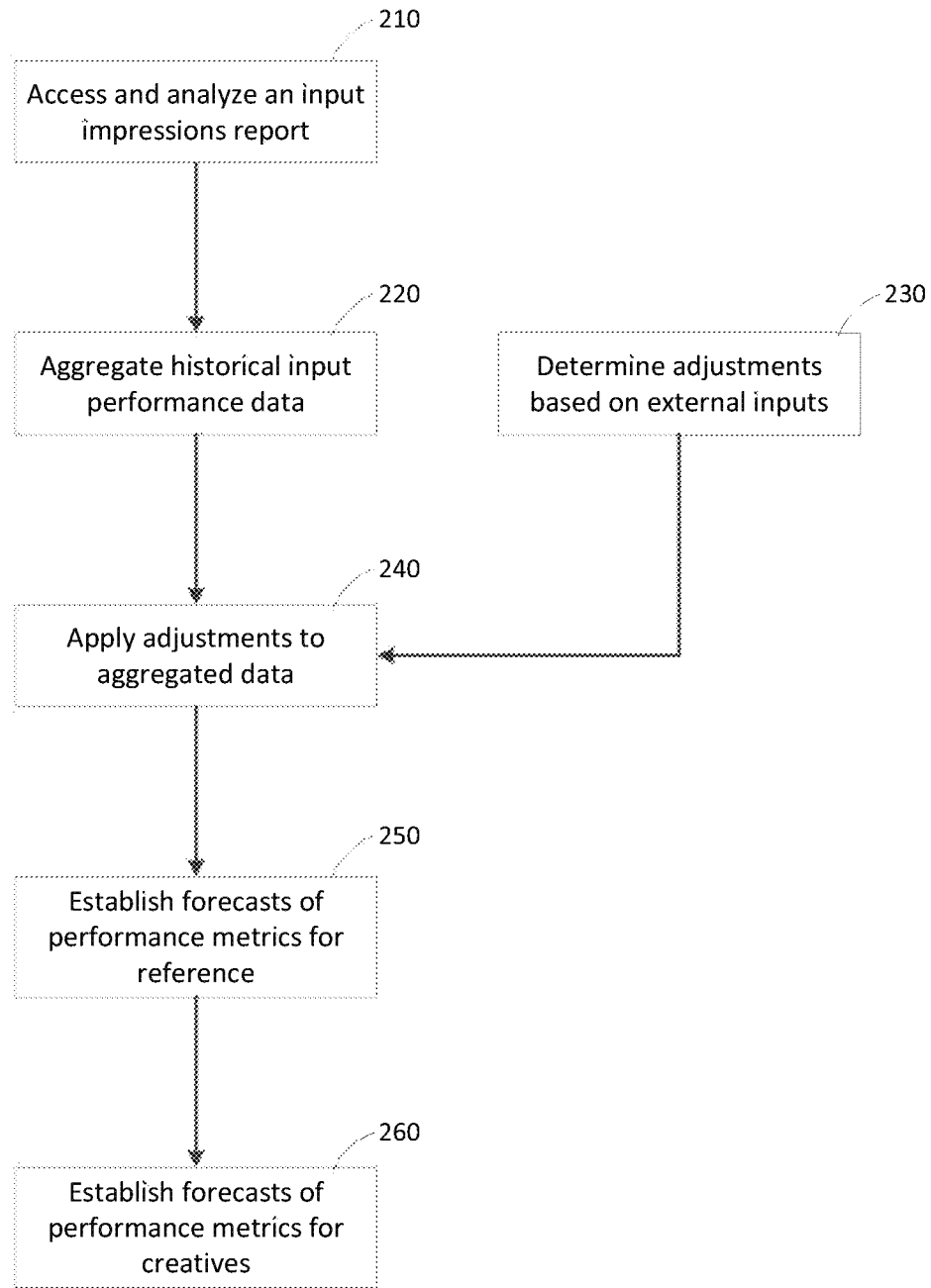
FIG. 2 is a flowchart depicting an embodiment of a process for establishing forecast of advertisement performance.

FIG. 2 depicts a flow chart showing processes establishing forecasts of performance metrics for creatives as used in an embodiment. Beginning in block 210, the system accesses and analyzes an input impressions report. The report may include data from the performance database 103, the creatives database 105, and user parameters 107 as illustrated in FIG. 1, for instance.

Moving on to blocks 220 and 230 the system determines adjustments based on external inputs and aggregates historical input performance data. For example, in block 230, the system may determine adjustment factors based on the day of the week or specific status of a particular day. Furthermore, particular events such as large media buys or a drop of in expected media buys may be used to adjust the performance inputs received by the system.

In block 220, the system may aggregate the historical input data to generate statistics for use in generating optimized recommendations. For instance, metrics for impressions, clicks, inquiries, revenue, and cost may be aggregated at each level of abstraction. For example, the system may aggregate the statistics at the placement-strategy-vertical level, the placement-strategy level, or any other level of abstraction. In addition, reference values may be generated during the aggregation to be used for later comparison to creative forecasts. For example, for particular creatives that are to be evaluated reference values indicating points of comparison for statistical testing may be generated based on the aggregated data. In some embodiments, when forecasting the performance of reference values, the system may first attempt to compute historical averages with reference to only those creatives currently in rotation in the system. If not enough data is available on the creatives currently in rotation, an average value referencing all creatives represented in the data input, including those had been removed from the system may be employed.

Moving on to block 240, the system generates adjustments to aggregated data based on the adjustment factors. In some embodiments, the adjustment factors are applied to particular statistics of each creative before aggregating into additional statistics.

In block 250, the system establishes forecast performance metrics for reference. For example, the generated metrics may include the impressions, clicks, and other metrics that may be expected from a generic creative within the system. In addition, the reference values may be generated for each particular placement, strategy, and/or vertical that any creative may be used on. Thus, the reference values may give a different expected value to each of a variety of placements for a creative and establish different expected results.

In block 260, the system establishes forecasts of performance metrics for each creative. In some embodiments, each creative may have a variety of forecasts for its performance on each of several placements or strategies. The forecasts established in block 260 may be used in comparison to the reference values established in block 270 to determine which creatives are given more weight for distribution through the ad-sever and to determine which creatives should eventually be removed from the system.

Figure 3:
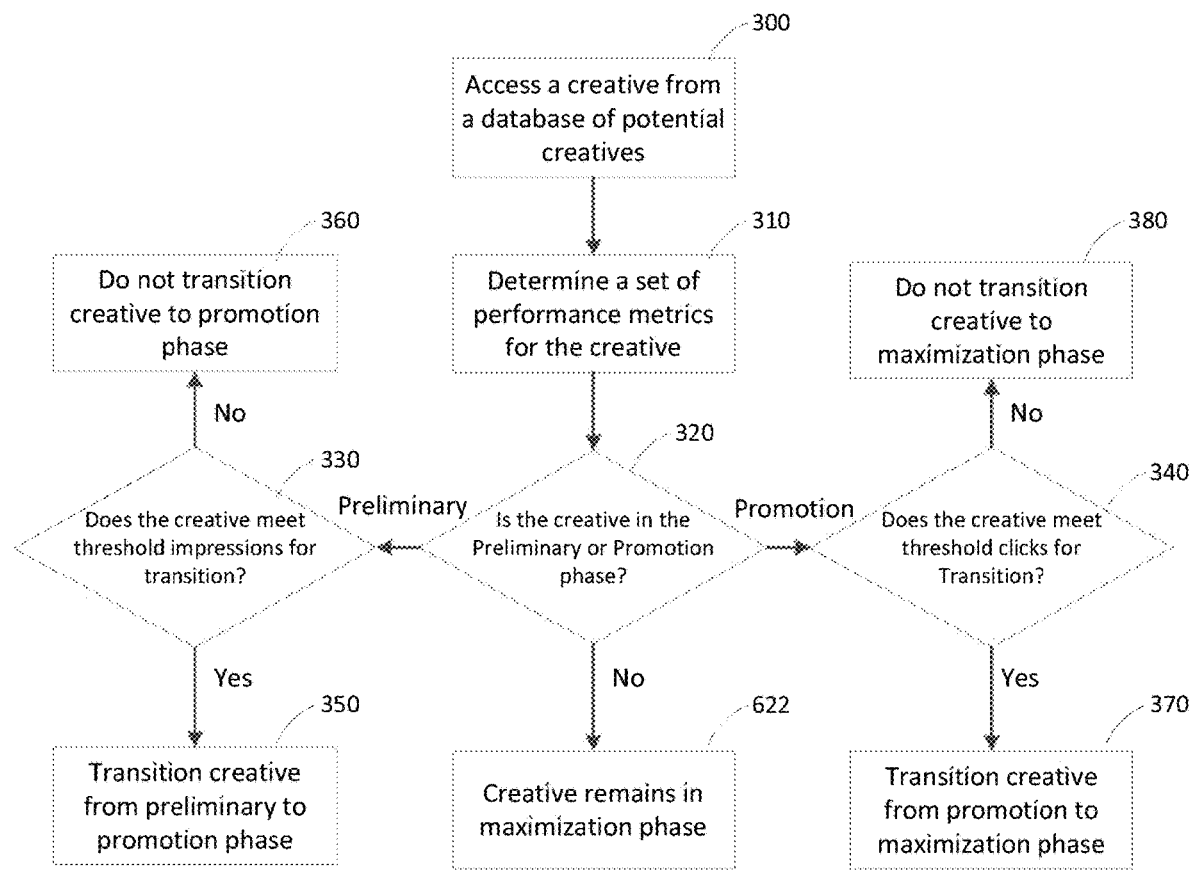
FIG. 3 is a flowchart depicting an embodiment of a process for determining an analysis phase for an advertisement.

FIG. 3 depicts a flow chart illustrating processes for determining the phase of a particular creative as used in an embodiment. In some embodiments, the system may include fewer or additional phases or the system may use different metrics for determining the transitions between phases.

Beginning in block 300, the system accesses a creative from a database of potential creatives. In some embodiments, a creative is given multiple phases for various placements, strategies, or verticals. Thus, a creative may be in a preliminary phase for one placement, but a maximization phase for another placement.

Moving on to block 310, the system may determine a set of performance metrics for the creative. For example, the historic performance of a creative may be established from the performance database 103. The performance metrics may include the impressions, clicks, revenue, or other factors established for the creative. In block 320, the system determines the current phase of a creative. In some embodiments, the current phase of a creative may be used to determine how to establish when the phase of the creative should be change. In some embodiments, Each creative may be assigned to the preliminary phase when it is first placed in rotation within a placement-strategy at a weight specified by user parameter. Performance in this phase may be evaluated on the click through rate. Creatives remain within the preliminary phase until a threshold based on number of impressions is attained, at which point it transitions to the promotion phase.

In some embodiments, if the creative is in the preliminary phase, it may be tested for transition to another phase based on a threshold number of impressions in block 330. For example, this threshold may be set such that there is sufficient statistical data for testing the creative before it is transitioned to a different testing phase. If a threshold number of impressions have been generated for the creative, it may be transitioned to the promotion phase in block 350, if not, the creative the system may leave the creative in the preliminary phase in block 360.

In some embodiments, if the creative is in the promotion phase, it may be tested for transition to another phase based on a threshold number of clicks in block 340. For example, once in the promotion phase, the creative may have sufficient impressions to use different metrics to test the success of the creative than when in the preliminary phase. In some embodiments, the basic purpose of the promotion phase is to assess the potential of creatives to perform well within a placement-strategy. In this phase, the evaluation process establishes weightings based on performance and also several parameters collectively constraining how quickly and by how much weights can be increased. In some embodiments, In some embodiments, within the promotion phase, the system may remove a creative on the basis of poor performance, or will transition to the maximization phase once a threshold based on number of clicks is attained. If there are sufficient clicks, the system may transition the creative from the promotion phase to the maximization phase in block 370, if there are not sufficient clicks, the system may leave the creative in the promotion phase in block 380.

In some embodiments, in block 320, if a creative is already in the maximization phase, the system has the creative remain in the maximization phase to be evaluated for a weighting by another process. In some embodiments, in the maximization phase, the system aims to aggressively increase reliance on top performing creatives and remove poor performers. Performance evaluation is based on the click through rate, the revenue per inquiry and a relation to the cost of using the creative. CTR, CR, RPI and Cost metrics (collectively, RPM/NCPM).

In addition to the determinations discussed in reference to block 340, a creative may be transitioned into the maximization phase if it has currently or had previously been in maximization phase or has been in rotation for more than a threshold number of days. In some embodiments, when the phases for all creatives within a placement-strategy have been assigned, creatives may be aggregated within two groups ('Test' and Max'), which may be compared statistically for the purpose of allocating weights between them.

Figure 4:
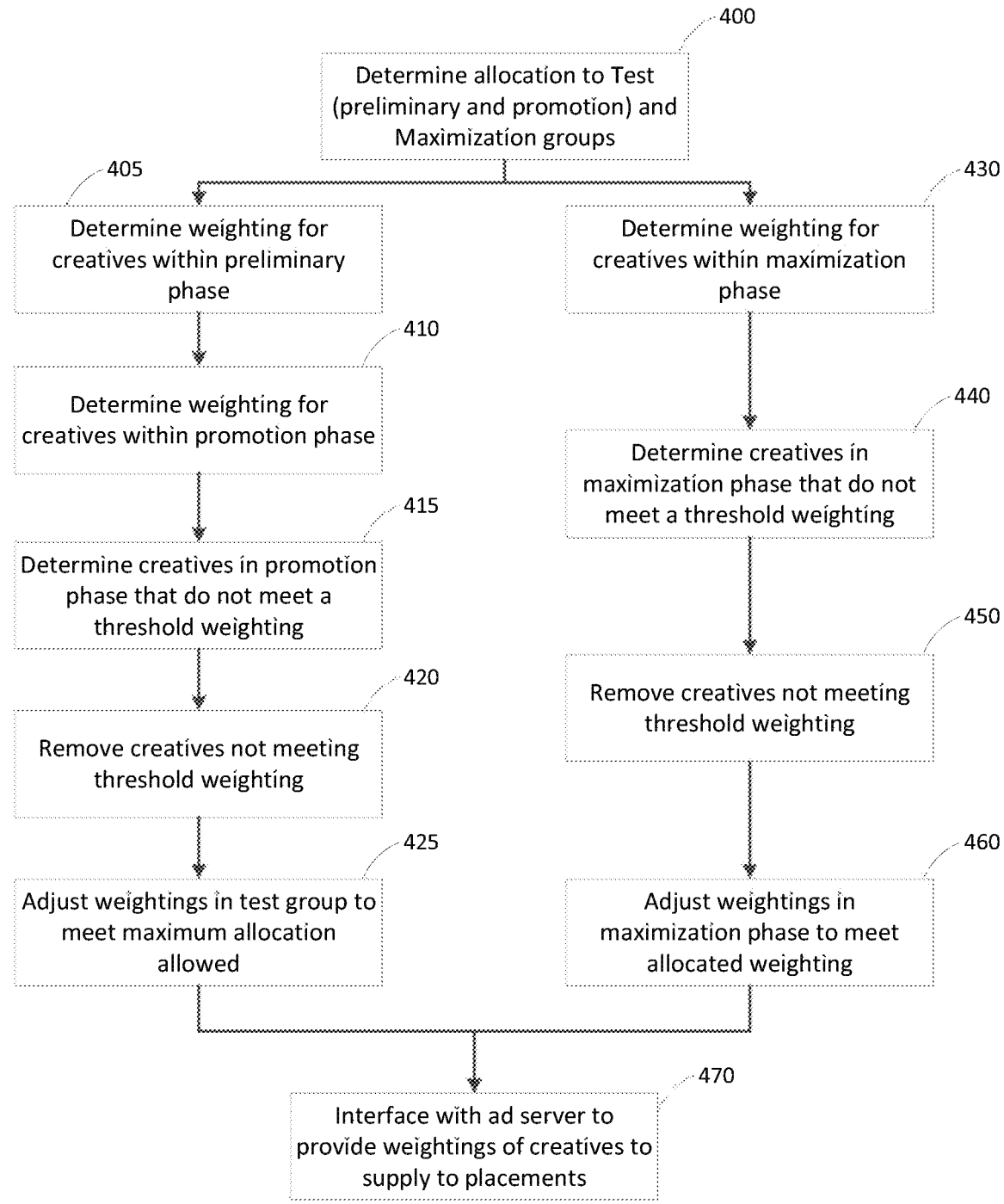
FIG. 4 is a flowchart depicting an embodiment of a process for determining weightings for placement of advertisements.

FIG. 4 depicts a flow chart illustrating processes for determining weightings to provide to an ad-server to direct the placement of creatives to various web pages. Beginning in block 400, the system determines an allocation to the different phases. In some embodiments, the preliminary and promotion phases may be given one maximum allocation as a group (for example, a test group) and the maximization group may receive the remaining allocation. For example, in some embodiments, the section allocation module 120 discussed in FIG. 1 may determine the maximum allocation to the test phases and the maximization phase. In some embodiments, the maximum allocation to each of the particular phases may also be determined by the system instead of grouping phases into a test group. For example, the section allocation module 120 may compare the potential of all creatives within the preliminary and promotional phases (collectively comprising the test group) with the performance of all creatives in the maximization phase to determine an appropriate cap on aggregate allocation to the test group. Thus, the allocation to the initial phase may be based on the likely future performance of the preliminary and promotion phases to the maximization phases. In some embodiments, the allocation may be based on the likely performance of the test group compared to the maximization group, but may also have constraints on the maximum scaling up and scaling down or the allocation to the test group or caps on the size of the allocation itself.

Moving on to block 405, in some embodiments, initial weights for each placement-strategy-creative in the preliminary phase are established with reference to the previous day's weight for the creative. In certain aspect, when a creative is being assessed by the algorithm for the first time, the previous day's weight is equal to the 'entry weight' set by user parameters, administrator, or the system, when the creative was placed in rotation on the placement-strategy. In some embodiments the amount by which the system adjusts its weighting may be based on the click through rate when compared to a reference value.

Moving on to block 410, in some embodiments the system may generate initial weights in the promotion phase, with reference to a weight cap (for example, a cap indicating that the initial weighting cannot exceed this value). The portion of the cap assigned to the creative as its initial weight is based on the click through rate and the conversion rate of the particular creative. For example, the weight may be provided based on the confidence value for the performance of the creative scaled based on the total cap available for creatives in the test phases.

Moving on to block 415, the system may test for creatives in the promotion phase that do not meet one or more thresholds. For example, if a creative has been in the promotion and/or preliminary phase for a threshold number of days and has not moved into the maximization phase, it may be identified as not meeting a threshold. In some embodiments, a creative may be protected from identification as not meeting a threshold in block 415 if the creative had been subject to a scaling up constraint, the creative had been subject to a scaling down constraint, the creative has not been in rotation for a threshold number of days, the creative is in the preliminary phase. A performance threshold may also be used for those creatives in the promotion phase. For example, the threshold may be determined by a computation that begins with a specified value for the maximization phase, reduces this value if the number of creatives in rotation is less than a specified threshold, scales down the resulting value based on the amount of weight reserved for new creatives, and selects the maximum of the resulting value and the threshold established for the promotion phase threshold. In block 420, the system may remove creatives not meeting the threshold weightings for the promotion phase. In some embodiments, in block 420, the system may check that at least one creative meets the calculated threshold. If no creative meets the threshold, the system may ensure that not all creatives are removed by the threshold by lowering the threshold or keeping the highest weighted creative.

Moving onto block 425, the system may adjust the initial weights by redistributing the weight of the removed creatives pro rata to the remaining creatives. In some embodiments, for application by the ad-server, final weights may be established by the system in block 425 with rounded numbers meeting the total allocation for the test phase.

The weights allocated to creatives in the maximization phase may be determined by the system in block 430. In some embodiments the weight available to be allocated across creatives within the maximization phase depends on the weight allocated to creatives in the preliminary and promotion phases in block 400. Initial weights for the maximization phase may then be set based on the confidence in the performance of the creatives. In some embodiments, the confidence in the creatives is adjusted by an aggressiveness factor. For example, if there are two or more creatives in the maximization phase, the system may determine that the best result favors the creative with the highest confidence score more than a direct weighting.

In some embodiments, an aggressiveness factor is computed and employed at the strategy level to determine how much weight is put on the currently best-performing creative in the maximization phase relative to all other creatives in maximization phase. The higher the value of this aggressiveness factor, the more weight is placed on the creative with the highest confidence value. Thus, the higher the aggressiveness factor, the more likely it is that other creatives will be removed from the placement's rotation. In some embodiments, an aggressiveness factor may be provided in the user parameters. In some embodiments, the aggressiveness factor is computed with a scoring model, on the basis of four components: (i) number of creatives currently being tested in and being introduced to ad rotation; (ii) number of inquiries available for evaluating the performance of the top-performer; (iii) whether or not the confidence levels on the top performers ICR and RPM are consistent; and (iv) amount of dispersion of the confidence values of creatives in the Maximization phase. The four components are computed in accordance with the following formulas. With preliminary computations complete, the aggressiveness factor may be computed on the basis of a base value and the scores for the four components. The aggressiveness factor then be applied the highest performing creative to generate an adjusted confidence that is higher than the actual confidence and may be applied to the other creatives to generate an adjusted confidence that is lower than the actual confidence. The system may the determine initial weights based on distribution of the weighting to the maximization phase based on the adjusted confidence values.

Moving on to block 440, those creatives not meeting the threshold weighting may be identified by the system. For example, a maximization threshold may be set by the user parameters as a confidence level or weighting required to remain in the system. In some embodiments, the threshold may be set as a maximum number of creatives that may remain in the maximization phase with the lowest performing creatives being removed to meet the threshold. In some embodiments, a threshold is determined by a computation that begins with a specified value for a maximization phase threshold, reduces the value if the number of creatives in rotation is less than a specified threshold, scales down the resulting threshold based on the amount of weight reserved for new creatives, and selects the maximization phase threshold as the greater of the resulting value and the threshold established for the promotion phase.

Moving on to block 450, those creatives not meeting a threshold are removed. In some embodiments, the creatives are removed from the rotation completely. In some embodiments, the creatives may be re-designated into the promotional phase and evaluated according the rules and threshold of the promotional phase. In some embodiments, the system may reserve the removed creatives for reintroduction if the other creatives in the maximization phase do not perform to expectations. In block 460, the system adjusts the remaining weightings to meet the allocated weighting for the maximization phase.

In some embodiments, in blocks 405, 410, and 430 the change in weighting between periodic performances of the processes allowed by the system may be limited by one or more scaling constraints. For example, a scaling up constraint may identify conditions under which the amount a weighting may be increased from the previous weighting for the creative is subject constraint. In those instances, the maximum value of the creative may be set by the scaling up constraint. In some embodiments, a creative may be subject to a scaling constraint based on the phase the creative is in, the number of days the creative has been in rotation is less than a threshold value, the weights are being generated for a particular type of day, the data does not surpass a set threshold number of event, other information indicating a particular creative may have outperformed its long term expected value, and/or a combination of these parameters. In some embodiments, a weighting may be subject to a constraint if the creative's weighting during the previous iteration is less than or equal to a specified threshold and the initial weighting for the current iteration computed by the system is greater than or equal to a specified threshold. In some embodiments, a weighting may be subject to a scaling up constraint if the creative's weighting in the previous iteration is greater than a specified threshold and the initial weighting for the current iteration computed by the system is greater than or equal to the creative's weighting for the previous iteration multiplied by a specified scaling up factor.

In some embodiment, if a creative is identified as being subject to a constraint that caps its allowable weighting below the initial weighting computed by the system, then initial weightings may be recomputed such that weights for the constrained creative are set at the capped amount and the aggregate difference between initially computed weighting for the constrained creative and the capped amount are distributed among non-constrained creatives pro rata with the initial weightings computed by the algorithm.

In some embodiments, the system also includes scaling down constraints. A first type of scaling down constraint may identify the conditions under which the amount by which a creative's weighting can be decreased from the previous day's is subject to being constrained, and, in those instances, establish the value of the constraint. A second type may apply exclusively to creatives that have been running for one day or less within a placement-ad. It can ensure that such creatives always receive a minimum amount of weight. For example, to ensure that no creative will be removed from rotation until it runs for at least two full days. In some embodiments, a creative may be identified as subject to a scaling down constraint based on the phase the creative is in, the number of days the creative has been in rotation, the weights are being generated for a particular type of day, the number of particular events associated with a particular creative, other information indicating a particular creative may have outperformed its long term expected value, and/or a combination of these parameters. In some embodiments, a creative may be subject to a scaling down constraint if the creative's weighting in the previous iteration is greater than or equal to a specified threshold. In some embodiments, a creative may be subject to a scaling down constraint if the creative's initial weighting computed in the current iteration is less than or equal to the previous weighting multiplied by a specified scaling down factor. In some embodiments, a creative may be subject to a scaling down constraint if it is currently in rotation, the creative has been in the rotations less than a threshold number of days, and the creatives initial weighting is less than or equal to a minimum threshold.

Moving on to block 470, the system interfaces with an ad-server to provide weightings of the creatives for placements on web pages. The instructions may further include various instructions for how to apply the weightings by the ad-server in delivery to various placements, strategies, and verticals. In some embodiments, the processes illustrated in FIG. 4 are repeated for each placement, strategy, and/or vertical in which a creative is active. Thus the interaction with the ad-server may provide a variety of weights for various creatives.

Figure 5:
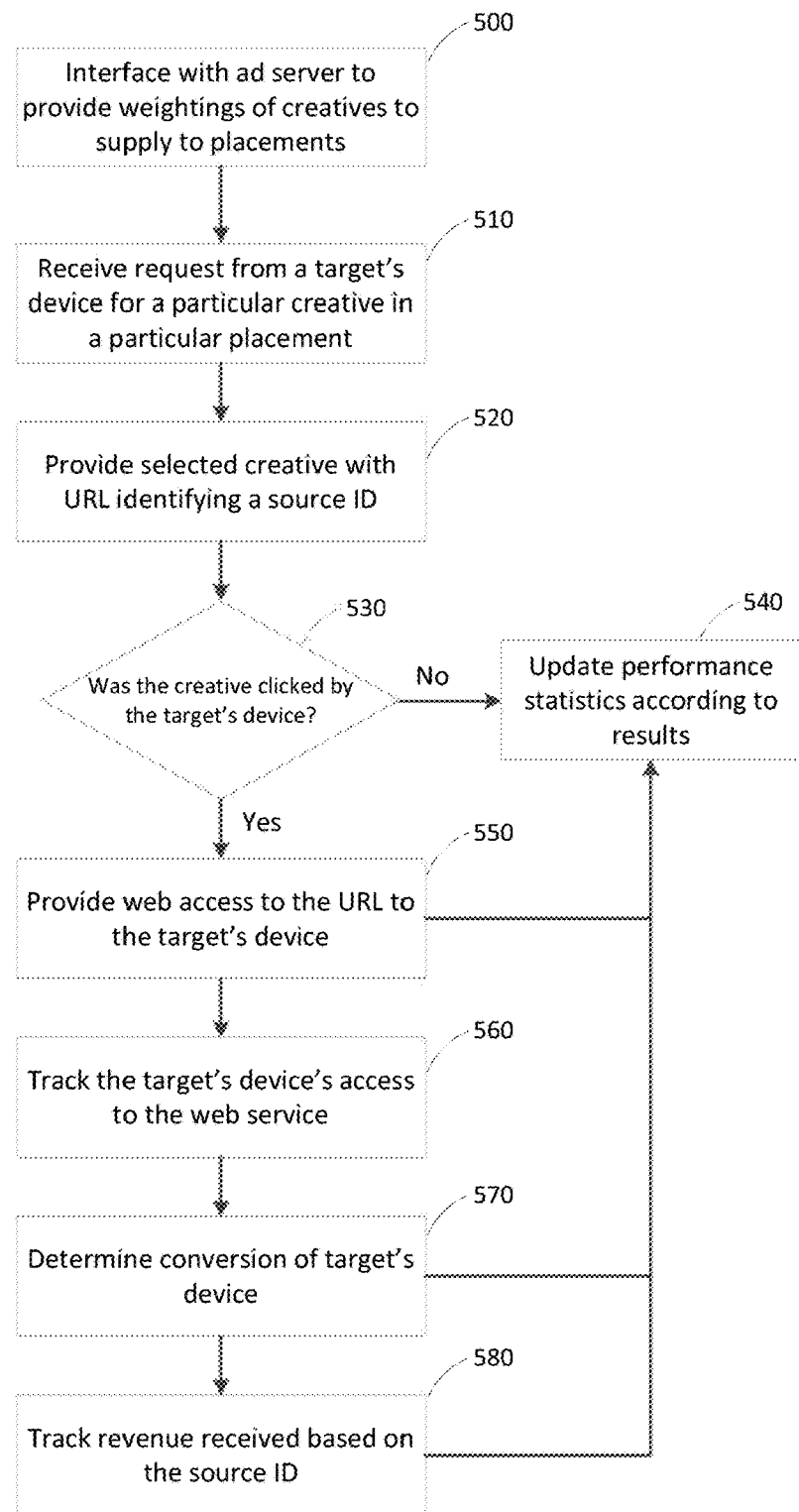
FIG. 5 is a flowchart depicting an embodiment of determining the performance of a placed advertisement.

FIG. 5 depicts a flow chart illustrating processes for tracking the performance of a creative processed through the system. Beginning in block 500, the system interfaces with the ad-server to provide weightings of creatives for various placements, strategies, and verticals. Moving onto block 510, the ad-server receives a request from a web-page for an advertisement to fill a placement based on access by a target device. For example, the web-page accessed by a target's device may request the URL of an advertisement to provide in a placement.

Moving on to block 520, the ad-server may provide a selected creative with a URL identifying they creative, placement, strategy, and/or vertical in addition to a link to a page provided if the creative is clicked. In some embodiments, the ad-server provides only a URL to a specific creative, which is then accessed by a server operating the web-page to incorporate into the placement on the target device's web-page. For example, the creative may be provided by the creative deliver module 140 described in FIG. 1.

Moving on to block 530, the system determines if the creative was clicked at the target device. If the creative was not clicked, the system may update the performance statistics in block 540 for the creative to include an impression for the creative, but not to include a click, a conversion, or any revenue. The system may determine if there is a click by a call from the target device. For example, if the target device calls the URL from the creative displayed, the system may receive a call at that URL with information on the particular creative that was clicked. If no such call is received, no positive performance will be recorded. In some embodiments, the system may not update the performance statistics in block 540 if there is no click, but may instead receive data concurrently, or at a later point, of the impression provided by the ad-server.

Moving on to block 550, the system may provide access to the URL to the target's device. At this point the system may analyze the URL to determine the creative that generated the call. This information may include the creative, the placement, the strategy, and/or vertical associated with the call. The system may then updated the performance statistics for each of these characteristics in the performance statistics in block 540.

Moving on to block 560, the system may track the target device's access to the web service provide at the web server. Tracking may be done by monitoring information transmitted through the web-page and collected by the web server and information provided by the web server to the target device. For instance, the interactive web system 162 that is part of web server 160 in FIG. 1 may provide and interactive web page to the target device and track the progress of a user of the target device.

Moving on to blocks 570 and 580, the system determines the conversion of the target device and revenue received based on the source ID and the target device. For example, a conversion may be recorded if the target device reaches a particular point on the web-server. For example the conversion may be recorded at a point when a user selects to submit information through a web-form or to make a purchase through the system. The source ID identifying the specific creative used and related characteristics may also be used to track the revenue from the initial impression. For example, if the information provided by the user is used to generate revenue, the system may associate that revenue with the source ID of the creative. In some embodiments, conversions from a target's device and revenue tracked from the source ID may be used to update the performance statistics of particular creatives.

Computer System

Figure 6:
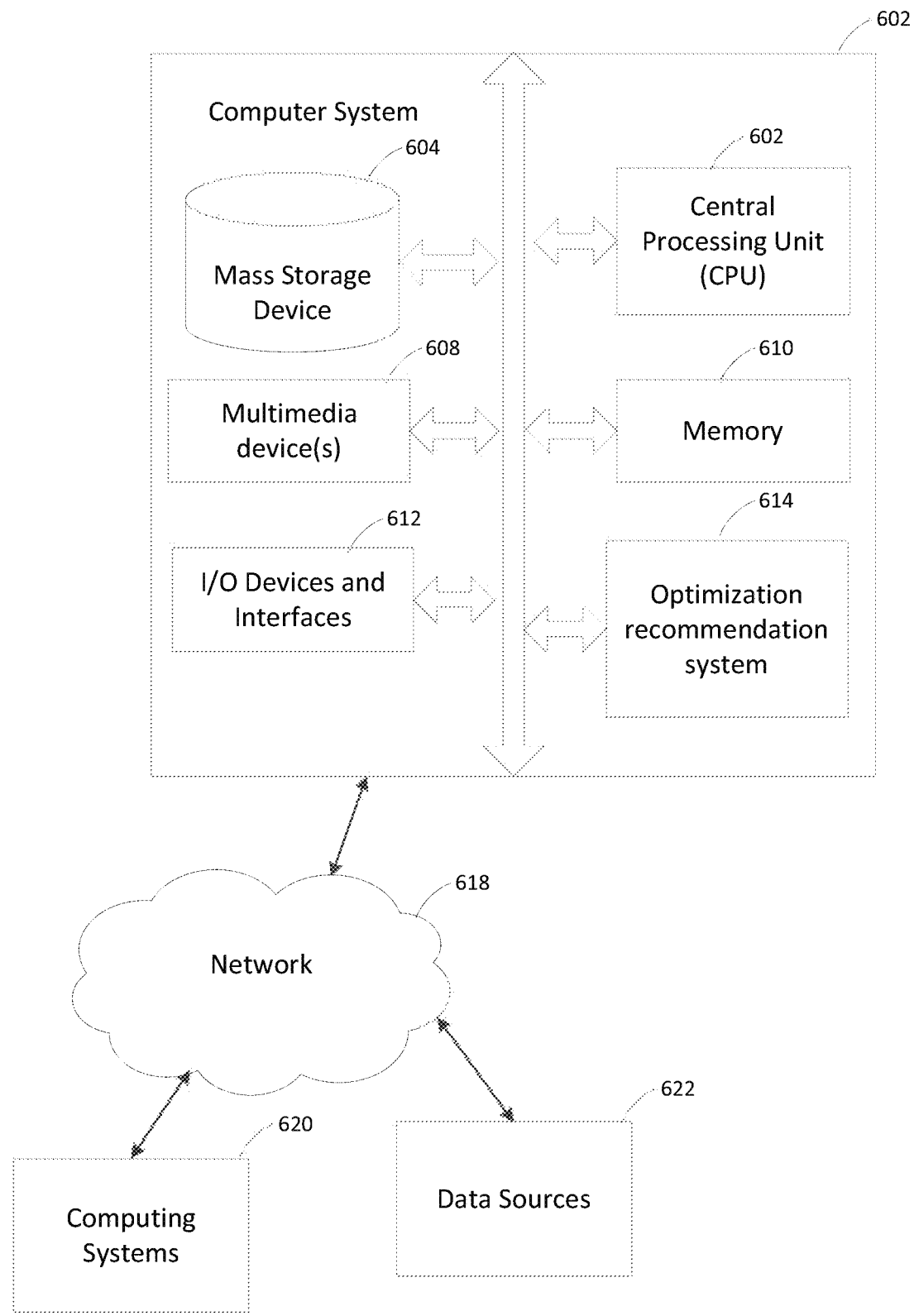
FIG. 6 is a block diagram depicting an embodiment of a computer hardware system configured to run software for implementing one or more embodiments of a system for optimizing advertisement placements.

In some embodiments, the systems, processes, and methods described above are implemented using a computing system, such as the one illustrated in FIG. 6. The example computer system 602 is in communication with one or more computing systems 620 and/or one or more data sources 622 via one or more networks 618. While FIG. 6 illustrates an embodiment of a computing system 602, it is recognized that the functionality provided for in the components and modules of computer system 602 may be combined into fewer components and modules, or further separated into additional components and modules.

Optimization Recommendation System

The computer system 602 includes an optimization recommendation system 614 that carries out the functions, methods, acts, and/or processes described herein. The optimization recommendation system 614 that is executed on the computer system 602 by a central processing unit 610 discussed further below.

In general the word "module," as used herein, refers to logic embodied in hardware or firmware or to a collection of software instructions, having entry and exit points. Modules are written in a program language, such as JAVA, C or C++, or the like. Software modules may be compiled or linked into an executable program, installed in a dynamic link library, or may be written in an interpreted language such as BASIC letters, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems, and may be stored on or within any suitable computer readable medium, or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

Computing System Components

The computer system 602 includes one or more processing units (CPU) 610, which may include a microprocessor. The computer system 602 further includes a physical memory 612, such as random access memory (RAM) for temporary storage of information, a read only memory (ROM) for permanent storage of information, and a mass storage device 604, such as a hard drive, diskette, or optical media storage device. Alternatively, the mass storage device may be implemented in an array of servers. Typically, the components of the computer system 602 are connected to the computer using a standards based bus system. The bus system can be implemented using various protocols, such as Peripheral Component Interconnect (PCI), Micro Channel, SCSI, Industrial Standard Architecture (ISA) and Extended ISA (EISA) architectures.

The computer system 602 includes one or more input/output (I/O) devices and interfaces 608, such as a keyboard, mouse, touch pad, and printer. The I/O devices and interfaces 608 can include one or more display devices, such as a monitor, that allows the visual presentation of data to a user. More particularly, a display device provides for the presentation of GUIs as application software data, and multi-media presentations, for example. The I/O devices and interfaces 608 can also provide a communications interface to various external devices. The computer system 602 may include one or more multi-media devices 606, such as speakers, video cards, graphics accelerators, and microphones, for example.

Computing System Device/Operating System

The computer system 602 may run on a variety of computing devices, such as a server, a Windows server, and Structure Query Language server, a Unix Server, a personal computer, a laptop computer, and so forth. In other embodiments, the computer system 602 may run on a cluster computer system, a mainframe computer system and/or other computing system suitable for controlling and/or communicating with large databases, performing high volume transaction processing, and generating reports from large databases. The computing system 602 is generally controlled and coordinated by an operating system software, such as z/OS, Windows 95, Windows 98, Windows NT, Windows 2000, Windows XP, Windows Vista, Windows 7, Linux, UNIX, BSD, SunOS, Solaris, or other compatible operating systems, including proprietary operating systems. Operating systems control and schedule computer processes for execution, perform memory management, provide file system, networking, and I/O services, and provide a user interface, such as a graphical user interface (GUI), among other things.

Network

The computer system 602 illustrated in FIG. 5 is coupled to a network 618, such as a LAN, WAN, or the Internet via a communication link (wired, wireless, or a combination thereof). Network 618 communicates with various computing devices and/or other electronic devices. Network 618 is communicating with one or more computing systems 620 and one or more data sources 622. The optimization recommendation system 614 that may access or may be accessed by computing systems 620 and/or data sources 622 through a web-enabled user access point. Connections may be a direct physical connection, a virtual connection, and other connection type. The web-enabled user access point may include a browser module that uses text, graphics, audio, video, and other media to present data and to allow interaction with data via the network 618.

The output module may be implemented as a combination of an all-points addressable display such as a cathode ray tube (CRT), a liquid crystal display (LCD), a plasma display, or other types and/or combinations of displays. The output module may be implemented to communicate with input devices 608 and they also include software with the appropriate interfaces which allow a user to access data through the use of stylized screen elements, such as menus, windows, dialogue boxes, tool bars, and controls (e.g., radio buttons, check boxes, sliding scales, and so forth). Furthermore, the output module may communicate with a set of input and output devices to receive signals from the user.

Other Systems

The computing system 602 may include one or more internal and/or external data sources (e.g., data sources 622). In some embodiments, one or more of the data repositories and the data sources described above may be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 602 also accesses one or more databases 622. The databases 622 may be stored in a database or data repository. The computer system 602 may access the one or more databases 622 through a network 618 or may directly access the database or data repository through I/O devices and interfaces 608. The data repository storing the one or more databases 622 may reside within the computer system 602.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Additional Embodiments

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods may be carried out using any appropriate apparatus. Further, the disclosure herein of any particular feature, aspect, method, property, characteristic, quality, attribute, element, or the like in connection with an embodiment may be used in all other embodiments set forth herein. Thus, it is intended that the scope of the present invention herein disclosed should not be limited by the particular disclosed embodiments described above.

What is claimed is:

1. A system for tracking conversion success and revenue of a creative based on target device interactions, the system comprising:
   one or more computer readable storage devices configured to store:
   a plurality of computer-executable instructions;

a plurality of placements, wherein each placement of the plurality of placements indicates a location within a user interface where a creative is rendered;
a plurality of creatives, wherein each creative of the plurality of creatives includes one or more images or text associated with one or more advertisements; and
weightings data comprising a plurality of weightings corresponding to the plurality of creatives, wherein the weightings data associated with each creative includes historical performance data of advertisements associated with each creative; and
one or more hardware computer processors in communication with the one or more computer readable storage devices to execute the plurality of computer-executable instructions to cause the system to:
receive, from a web server in communication with a target device, a request for one or more creatives to be placed on a webpage at one or more available placements, wherein the request includes device identifying information identifying the target device and parameters that indicate a type of device of the target device;
in response to receiving the request, generate performance forecast data for a first creative of the plurality of creatives at a first placement of the plurality of placements by:
accessing the historical performance data corresponding to the first creative which is based at least in part on a historical performance of advertisements associated with the first creative;
determining a reference value for each placement that the first creative may be used on; and
determining performance forecasts for the first creative based at least in part on the historical performance data;
perform statistical tests on the historical performance data to determine a likely future performance of the first creative at the first placement by:
determining a confidence value by comparing the first creative to reference values, wherein the confidence value indicates that the first creative at the first placement will likely outperform other creatives of the plurality of creatives at the first placement;
generate weightings data for the first creative at the first placement based at least in part on the confidence value and performance forecasts, wherein the confidence value is adjusted based on an aggressiveness factor, wherein a high aggressiveness factor corresponds to more weight being placed on the first creative, and wherein the aggressiveness factor is computed based at least in part on three or more of:
(i) a number of creatives that are a part of an advertising plan;
(ii) a number of inquiries available for evaluating a top performer's performance with respect to revenue generated or number of selections over a period of time;
(iii) a degree to which confidence values on top performers impression conversion rate and revenue per thousand impressions are consistent; and
(iv) an amount of dispersion of confidence values of creatives with respect to variation of the confidence values in relation to a mean confidence value;
based at least in part on a determination that the first creative is appropriate to send to the web server, generate and transmit, to the web server, instructions for accessing the first creative and for displaying the first creative on the target device at a first placement, wherein the instructions are configured for transmission from the web server to the target device to allow the target device to access the first creative from a server external to the web server;
determine a revenue that was generated based at least in part on a selection of the first creative;
determine conversion success of the first creative based at least in part on whether the target device reaches online content associated with selection of the first creative; and update the weightings data based at least in part on the determined conversion success, the determined revenue.

2. The system of claim 1, wherein the weightings data is based at least in part on each creative's association with one or more placements; and is based at least in part on a confidence value associated with a likelihood that a particular creative will generate more revenue than other creatives that are available for the same placement.

3. The system of claim 1, wherein the one or more hardware computer processors are further configured to cause the system to:
receive an indication that a creative was selected at the target device; and
determine a source identifier associated with the selected creative, wherein the source identifier includes information identifying the first creative, indicating that a user of the target device selected the first creative on the webpage served to the target device.

4. The system of claim 3, wherein the source identifier also includes information about one or more of: the first placement of the first creative, a strategy of the first creative, and a vertical associated with the request from the target device.

5. The system of claim 1, wherein the one or more hardware computer processors are further configured to cause the system to:
continue monitoring the target device to determine additional factors that include:
(1) any additional revenue generated throughout a sales cycle, and
(2) actual business revenue gained by an advertiser associated with the first creative.

6. The system of claim 1, wherein the determined conversion success is based at least in part on information related to an amount of time between transmitting the first creative to the target device and the selection of the first creative at the target device.

7. The system of claim 1, wherein the determined conversion success is based at least in part on information related to revenue received based on the selection of the first creative and target device.

8. The system of claim 1, wherein the determined conversion success is based at least in part on information related to one or more of: a source identifier, the placement of the first creative, a strategy of the first creative, and a vertical associated with the request from the target device.

9. The system of claim 1, wherein the one or more hardware computer processors are further configured to cause the system to:
track the target device's access to the system.

10. The system of claim 9, wherein the tracking of the target device's access to the system is performed by monitoring information transmitted from the system to the target device or received by the system from the target device.

11. The system of claim 1, wherein the instructions for accessing the first creative comprise a URL associated with the first creative.

12. The system of claim 1, wherein the weightings data also indicate respective proportions of time that a creative is to be selected for display in response to a call from a placement publisher for delivery of an impression.

13. The system of claim 1, wherein the one or more hardware computer processors are further configured to cause the system to:
receive, from the web server, a second request that includes second device identifying information identifying a second target device and parameters that indicate a type of device of the second target device, wherein the second request includes one or more available placements on the webpage associated with the web server, and wherein the second device identifying information is different from the device identifying information of the target device;
determine a second creative of the plurality of creatives based at least partly on the weightings data and the one or more available placements;
determine a second placement of the second creative for the second target device based at least partly on the weightings data, the one or more available placements, and the second device identifying information;
and transmit, to the web server, instructions for accessing the second creative and for displaying the second creative on the second target device at the second placement, wherein the instructions for accessing the second creative are configured such that the web server can transmit the instructions to the second target device such that the second target device can access the second creative from a server external to the web server.

14. A system comprising:
one or more computer readable storage devices configured to store:
a plurality of computer-executable instructions;
a plurality of placements, wherein each placement of the plurality of placements indicates a location within a user interface where a creative is rendered;
a plurality of creatives, wherein each creative of the plurality of creatives includes one or more images or text associated with one or more advertisements; and
weightings data comprising a plurality of weightings corresponding to the plurality of creatives, wherein the weightings data associated with each creative includes historical performance data of advertisements associated with each creative; and
one or more hardware computer processors in communication with the one or more computer readable storage devices to execute the plurality of computer-executable instructions to cause the system to:
receive, from a web server in communication with a target device, a request for one or more creatives to be placed on a webpage at one or more available placements, wherein the request includes device identifying information identifying the target device;
generate performance forecast data for a first creative of the plurality of creatives at a first placement of the plurality of placements by:
accessing the historical performance data corresponding to the first creative;
determining a reference value for each placement that the first creative may be used on; and
determining performance forecasts for the first creative based at least in part on the historical performance data;
perform statistical tests on the historical performance data to determine a likely future performance of the first creative at a first placement by:
determining a confidence value by comparing the first creative to reference values, wherein the confidence value indicates that the first creative at the first placement will likely outperform other creatives of the plurality of creatives at the first placement;
generate weightings data for the first creative at the first placement based at least in part on the confidence value and performance forecasts, wherein the confidence value is adjusted based on an aggressiveness factor, wherein a high aggressiveness factor corresponds to more weight being placed on the first creative, and wherein the aggressiveness factor is computed based at least in part on two or more of:
(i) a number of creatives that are a part of an advertising plan;
(ii) a number of inquiries available for evaluating a top performer's performance with respect to revenue generated or number of selections over a period of time;
(iii) a degree to which the confidence values on top performers impression conversion rate and revenue per thousand impressions are consistent;
and (iv) an amount of dispersion of the confidence values of creatives with respect to variation of the confidence values in relation to a mean confidence value;
generate and transmit, to the web server, instructions for accessing the first creative and for displaying the first creative on the target device at a first placement, wherein the instructions are configured for transmission from the web server to the target device to allow the target device to access the first creative from a server external to the web server;
determine conversion success of the first creative based at least in part on whether the target device reaches online content associated with selection of the first creative; and
update the weightings data based at least in part on the determined conversion success.

15. The system of claim 14, wherein the one or more hardware computer processors are further configured to cause the system to:
receive an indication that a creative was selected at the target device; and
determine a source identifier associated with the selected creative, wherein the source identifier includes information identifying the first creative, indicating that a user of the target device selected the first creative on the webpage served to the target device.

16. The system of claim 14, wherein the one or more hardware computer processors are further configured to cause the system to:
continue monitoring the target device to determine additional factors that include:
(1) any additional revenue generated throughout a sales cycle, and
(2) actual business revenue gained by an advertiser associated with the first creative.

* * * * *

UNITED STATES PATENT AND TRADEMARK OFFICE
CERTIFICATE OF CORRECTION

PATENT NO. : 11,880,865 B1
APPLICATION NO. : 17/806184
DATED : January 23, 2024
INVENTOR(S) : Jonathan Frederick Ripper et al.

It is certified that error appears in the above-identified patent and that said Letters Patent is hereby corrected as shown below:

In the Specification

Column 6, Line 55, delete "modue" and insert -- module --.

Column 6, Line 56, delete "intervace" and insert -- interface --.

Column 7, Line 30, delete "preceeding" and insert -- preceding --.

Column 7, Line 67, delete "devined" and insert -- defined --.

Column 7, Line 67, delete "ime frame" and insert -- timeframe --.

Column 8, Line 20, delete "p ("SD(RPI)p-v")" and insert -- p ("SD(RPI)p-v"). --.

Column 8, Line 27, after "system." delete "The creatives database".

Column 8, Line 66, delete "TshdCreTestver32" and insert -- TshdCreTestver = --.

Column 10, Line 50, delete "administrater" and insert -- administrator --.

Column 11, Line 8, delete "withing" and insert -- within --.

Column 11, Line 37, delete "employed" and insert -- employed. --.

Column 11, Line 47, delete "withing" and insert -- within --.

Column 11, Line 54, delete "The" and insert -- the --.

Column 11, Line 67, delete "promotion'" and insert -- 'promotion' --.

Signed and Sealed this
Seventh Day of May, 2024

Katherine Kelly Vidal
*Director of the United States Patent and Trademark Office*

Column 14, Line 64, delete "Each" and insert -- each --.

Column 15, Line 26, after "increased." delete "In some embodiments,".

Column 15, Line 53, delete "Max')," and insert -- 'Max'), --.

Column 17, Line 67, delete "according the" and insert -- according to the --.

In the Claims

Column 26, Line 23, In Claim 14, delete "which the" and insert -- which --.

Column 26, Line 26, In Claim 14, delete "of the" and insert -- of --.